US010303553B2

(12) United States Patent
Spieler et al.

(10) Patent No.: US 10,303,553 B2
(45) Date of Patent: May 28, 2019

(54) PROVIDING DATA BACKUP

(71) Applicant: HEWLETT PACKARD ENTERPRISE DEVELOPMENT LP, Houston, TX (US)

(72) Inventors: Orasio Spieler, Yehud (IL); Adi Kopelevich, Yehud (IL); Tom Gur, Yehud (IL); Yoni Roit, Yehud (IL)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 363 days.

(21) Appl. No.: 15/319,322

(22) PCT Filed: Jul. 28, 2014

(86) PCT No.: PCT/US2014/048384
§ 371 (c)(1),
(2) Date: Dec. 15, 2016

(87) PCT Pub. No.: WO2016/018207
PCT Pub. Date: Feb. 4, 2016

(65) Prior Publication Data
US 2017/0147443 A1    May 25, 2017

(51) Int. Cl.
*G06F 11/00* (2006.01)
*G06F 11/14* (2006.01)

(52) U.S. Cl.
CPC ...... *G06F 11/1451* (2013.01); *G06F 11/1453* (2013.01); *G06F 11/1469* (2013.01); *G06F 2201/80* (2013.01)

(58) Field of Classification Search
CPC ............. G06F 11/1464; G06F 11/1448; G06F 11/1458; G06F 1/12; G06F 12/0804; Y10S 707/99953; Y10S 707/99955
See application file for complete search history.

(56) References Cited

U.S. PATENT DOCUMENTS

| 8,473,515 | B2 | 6/2013 | Cotner et al. | |
| 8,706,800 | B1 | 4/2014 | Ahmed et al. | |
| 2005/0198411 | A1* | 9/2005 | Bakke | G06F 12/0804 710/22 |

(Continued)

OTHER PUBLICATIONS

HCL Technologies. Ltd., "Multi-Tenancy on Private Cloud," (Research Paper), Feb. 2012, White Paper, 20 pages, available at https://www.google.com/url?sa=t&rct=j&q=&esrc=s&source=web&cd=cd=2&ved=0CCYQFjAB&url=http%3A%2F%2Fwww.holtech.com%2Fsites%2Fdefault%2Ffiles%2Fcdmk_0.pdf&ei=qBnOU8SnNtSeugTVg4HQOw&usg=AFQjCNHZ3lHRdyNTG_PMO2sYDpW_4DlZcw&sig2=Sg8pflDqsQndJ2u3aluPGA&bvm=bv.71198958.d.c2E&cad=rja.

(Continued)

*Primary Examiner* — Augustine K. Obisesan

(57) ABSTRACT

Examples relate to providing data backup for a multi-tenant application. One example enables determination that a first data set for a first tenant from the application should be backed up and determination, independently from determining the first data set should be backed up, that a second data set for a second tenant from the application should be backed up. Responsive to determining the first data set should be backed up, a first portion of the first data set stored at a first data resource of a first type may be accessed via a first adaptor for the first type of data resource, and a second portion of the first data set stored at a second data resource of a second type may be accessed via a second adaptor for the second type of data resource. The accessed portions of the first data set may be stored.

15 Claims, 2 Drawing Sheets

(56) References Cited

U.S. PATENT DOCUMENTS

| | | |
|---|---|---|
| 2005/0257085 A1 | 11/2005 | Haustein et al. |
| 2012/0173488 A1* | 7/2012 | Spielberg .............. G06F 3/0622 |
| | | 707/639 |
| 2012/0246118 A1 | 9/2012 | Feng et al. |
| 2013/0238557 A1 | 9/2013 | Mandelstein et al. |
| 2014/0068258 A1 | 3/2014 | Chao |
| 2014/0074793 A1 | 3/2014 | Doering et al. |
| 2015/0032696 A1* | 1/2015 | Camble ............... G06F 11/1456 |
| | | 707/634 |

OTHER PUBLICATIONS

International Search Report & Written Opinion received in PCT Application No. PCT/US2014/048384, dated Mar. 2, 2015, 10 pages.

* cited by examiner

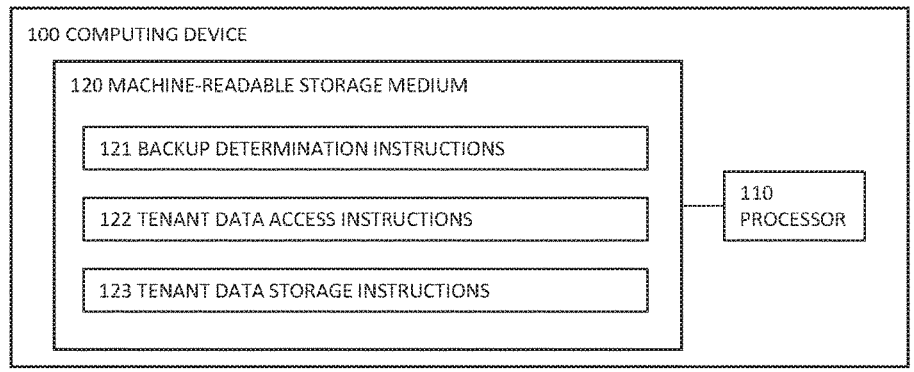
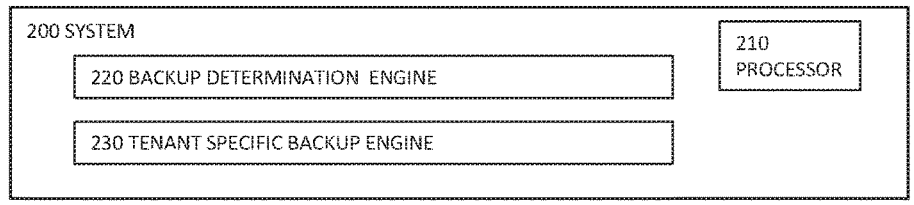
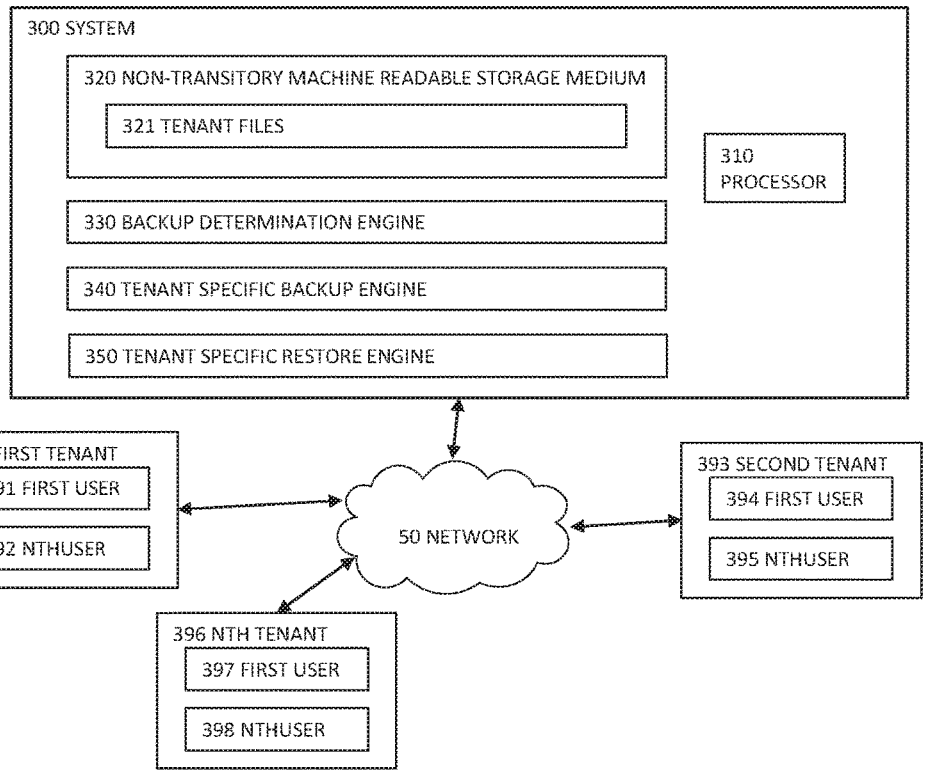

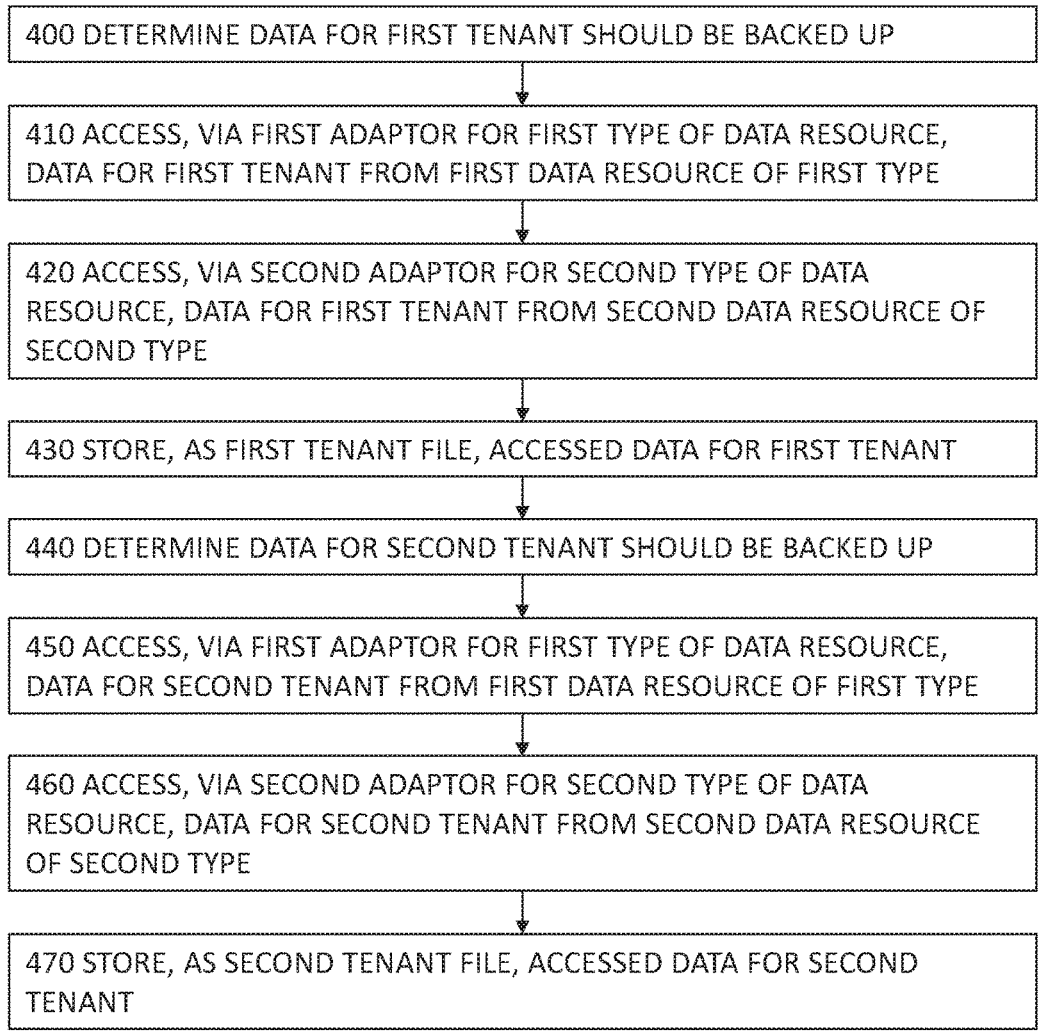
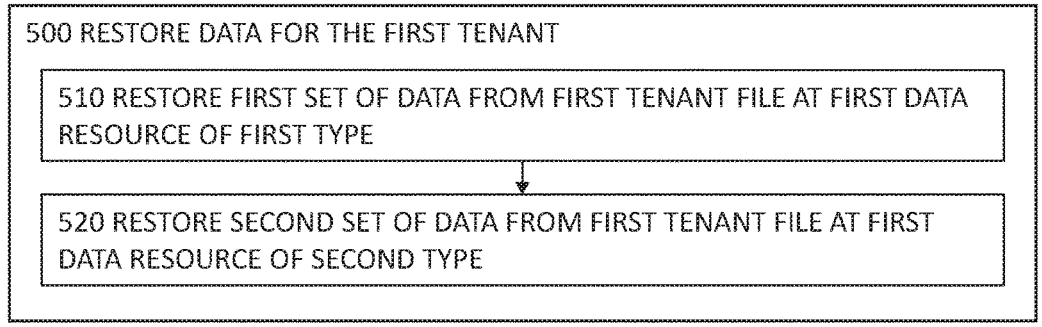

PROVIDING DATA BACKUP

BACKGROUND

Computing systems may allow multiple users to access resources via a single server. These computing systems may store data for multiple tenants in multiple data resources of different types.

BRIEF DESCRIPTION OF THE DRAWINGS

The following detailed description references the drawings, wherein:

FIG. 1 is a block diagram of an example system for providing data backup;

FIG. 2 is a flowchart of an example system for providing data backup;

FIG. 3 is a flowchart of an example system for providing data backup;

FIG. 4 is a flowchart of an example method for providing data backup; and

FIG. 5 is a flowchart of an example method for restoring backed up data for a tenant.

DETAILED DESCRIPTION

The following detailed description refers to the accompanying drawings. Wherever possible, the same reference numbers are used in the drawings and the following description to refer to the same or similar parts. While several examples are described in this document, modifications, adaptations, and other implementations are possible. Accordingly, the following detailed description does not limit the disclosed examples. Instead, the proper scope of the disclosed examples may be defined by the appended claims.

A computing system may provide access to a multi-tenant application from a server. During execution of the application, the computing system may store data for each tenant across multiple data resources of multiple types. The computing system may backup and restore data for a data set of a tenant from the application and across the multiple resources while attempting to minimize a loss of access of the multi-tenant application to other tenants. For example, the computing system may provide a set of adaptors via which data for the tenant may be accessed. Each adaptor may facilitate access to data resources of a same type. As such, the computing system may perform data backup on a tenant-by-tenant basis using adaptors specific for the data resources accessed by the system. The computing system may also restore data to the data resources accessed by the system on a tenant-by-tenant basis.

By providing tenant-by tenant backup and restore functionality, the computing system may allow the application to perform test functionality on data for a tenant, may allow roll back of data for a tenant, may enable moving of tenant data from one system to another and/or from one data resource to another data resource, and/or facilitate other functionality that affects data of the tenant.

As also noted below, each tenant may comprise an entity that includes a set of users (often multiple users). Each tenant (and each user of a tenant) may access the application via a respective tenant system (and user computing device). As such, discussion of functionality performed by a tenant (and/or user) may comprise functionality performed by a respective tenant computing system (and/or user computing device).

Referring now to the drawings, FIG. 1 is a block diagram of an example system 100 for providing data backup for a multi-tenant application. System 100 may comprise a cloud server, a mainframe, notebook, desktop, tablet, workstation, mobile device, and/or any other device suitable for executing the functionality described below. In the embodiment of FIG. 1, system 100 includes a non-transitory machine-readable storage medium 120 and a processor 110.

Processor 110 may be one or more central processing units (CPUs), microprocessors, and/or other hardware devices suitable for retrieval and execution of instructions stored in machine-readable storage medium 120. Processor 110 may fetch, decode, and execute program instructions 121, 122, 123, and/or other instructions to enable providing data backup for a multi-tenant application, as described below. As an alternative or in addition to retrieving and executing instructions, processor 110 may include one or more electronic circuits comprising a number of electronic components for performing the functionality of one or more of instructions 121, 122, 123, and/or other instructions.

In one example, the program instructions 121, 122, 123, and/or other instructions can be part of an installation package that can be executed by processor 110 to implement the functionality described herein. In this case, memory 120 may be a portable medium such as a CD, DVD, or flash drive or a memory maintained by a computing device from which the installation package can be downloaded and installed. In another example, the program instructions may be part of an application or applications already installed on system 100.

Machine-readable storage medium 120 may be any hardware storage device for maintaining data accessible to system 100. For example, machine-readable storage medium 120 may include one or more hard disk drives, solid state drives, tape drives, and/or any other storage devices. The storage devices may be located in system 100 and/or in another device in communication with system 100. For example, machine-readable storage medium 120 may be any electronic, magnetic, optical, or other physical storage device that stores executable instructions. Thus, machine-readable storage medium 120 may be, for example, Random Access Memory (RAM), an Electrically-Erasable Programmable Read-Only Memory (EEPROM), a storage drive, an optical disc, and the like. As described in detail below, machine-readable storage medium 120 may be encoded with executable instructions for providing data backup for a multi-tenant application. As detailed below, storage medium 120 may maintain and/or store the data and information described herein.

Backup determination instructions 121, when executed by processor 110, may determine that a data set associated with a tenant of the multi-tenant application should be backed up. The backup determination instructions 121, when executed by processor 110, may determine that data should be backed up responsive to a resource on a server becoming available for use for an application. The multi-tenant application may be, for example, any application executing on a server in the system 100. The application may be executed on the server and may access other resources in the system. In some examples, the application may be a cloud-based application, with an instance of the application being executed on the server in the system 100. The data resources accessed by the application may comprise, for example, a postgres database, a proprietary database, another type of SQL database, a big data storage system, a NoSQL database, a file system, a search engine, another persistent storage device, and/or other data resource that may be used by the application to store data.

A tenant may comprise, for example, an entity that accesses the application. A tenant may comprise a set of users, such that each user of the tenant may independently access the application. For example, a first tenant may comprise a set of independent accesses to the application from a second tenant. The set of independent accesses of the first tenant may be performed by multiple users of the first tenant. A data set associated with a tenant may comprise data associated with each of the users of the tenant. In some examples, data in the data set may comprise and/or be associated with one or more of: a tenant identifier, a date and time of storage, a date and time of last access, a user identifier identifying a set of users of the tenant that are associated with the data, and/or other information related to the data. In some examples, data in the data set for a tenant may be tagged with, have as metadata, and/or otherwise be associated with one or more of the items of information related to the data.

The backup determination instructions 121, when executed by processor 110, may determine that a first data set for a first tenant from the multi-tenant application should be backed up. The backup determination instructions 121, when executed by processor 110, may make this determination independently from a determination to back up data for a second tenant accessing the multi-tenant application.

In some examples, the backup determination instructions 121, when executed by processor 110, may determine that a first data set for the first tenant should be backed by receiving an indication that the first data set should be backed up. The backup determination instructions 121, when executed by processor 110, may receive the indication from the tenant, from an administrator of the application, responsive to functionality of the application that may automatically produce the indication, and/or by other manners. The indication may comprise, for example, a tenant identifier. In some examples, the indication may comprise, for example, a tenant identifier, a user identifier identifying a set of users, a set of data conditions, and/or other information related to the data of the first tenant to be backed up. In these examples, the first set of data backed up by the system may comprise data associated with the tenant and the set of users which meet the set of conditions.

In some examples, the backup determination instructions 121, when executed by processor 110, may determine that the first data set should be backed up based on predetermined time intervals at which data for the tenant is automatically backed up. For example, the machine-readable storage medium 120 may store a time interval after which data should be backed up for the first tenant, a time of last backup, and/or other information related to when data for the first tenant should be backed up.

Tenant data access instructions 122, when executed by processor 110, may perform data backup of the first set of data for the first tenant responsive to the backup determination instructions 121 determining that data backup should be performed. For example, the tenant data access instructions 122, when executed by processor 110, may access portions of the first set of data from each data resource accessed by the application via an adaptor corresponding to the data resource based on type of data resource. For example, the tenant data access instructions 122, when executed by processor 110, may access a first portion of the first data set from a first data resource of a first type using a first adaptor for data resources of the first type and may access a second portion of the first data set from a second data resource of a second type using a second adaptor for data resources of the second type.

As discussed further below, each data resource of a particular type may have a corresponding adaptor via which the system 100 may access data. The system 100 may communicate with each data resource of a same type (e.g., each SQL database) with a same adaptor. The adaptor may comprise a communication protocol specific to a data resource of the same type. In some examples, the adaptor may also comprise a set of predetermined queries usable by the application to access data from the data resource of the same type. The tenant data access instructions 122, when executed by processor 110, may communicate with the first data resource using a first communication protocol of the first adaptor and using a predetermined set of queries associated with the first adaptor, as discussed below.

An adaptor may comprise, for example, a component to communicate with a data resource of a specific type. An adaptor may comprise generally a combination of hardware and software to facilitate access to data resources of a same type. In some examples, an adaptor may comprise instructions to facilitate the communication described herein. The instructions may be stored in the non-transitory machine-readable storage medium 120 and handled in a manner similar to instructions 121, 122, 123, and/or other instructions. In other examples, the adaptor may comprise a combination of hardware and software similar to the engines described below.

In some examples, an adaptor may comprise multiple communication protocols and may be able to communicate with data resources of multiple types. For example, the system 100 may comprise a set of adaptors that comprise a set of communication protocols. The set of communication protocols may comprise, for example, a communication protocol for each type of data resource accessed by the system.

An adaptor may comprise one or more communication protocols. In some examples, the communication protocols may be allocated among adaptors based on the usage of the data resources of each type, based on a load balancing of access to data resources of each type, based on information related to the application, based on information received by an administrator, and/or in other manners. In some examples, the allocation of the communication protocols among the adaptors may be changed based on these and/or other factors. In some examples, a first adaptor may comprise a first communication protocol to provide access to a data resource of a first type and a second communication protocol to provide access to a data resource of a second type. In this example, a second adaptor may comprise a third communication protocol to provide access to a data resource of a third type. The number of adaptors and communication protocols included in a single adaptor are not limited to the examples described here.

The tenant data storage instructions 123, when executed by processor 110, may cause storage of the accessed portions of the first data set. In some examples, the tenant data storage instructions 123, when executed by processor 110, may cause storage of the accessed portions of the first data set as a first tenant file for the first tenant. In some examples, the tenant data storage instructions 123, when executed by processor 110, may cause the accessed portions of data from each data resource to be stored in the tenant file such that each portion of data from an individual data resource is associated with an identifier for that data resource. As such, the system 100 may easily determine a source of data in the tenant data file. The tenant data storage instructions 123, when executed by processor 110, may also cause data in the tenant file to be stored with information related to a date and time of access, any information related to a request to back up the data, and/or other information related to the data included in the tenant data file.

The tenant data storage instructions 123, when executed by processor 110, may cause storage of a separate tenant file for a tenant each time data backup for the tenant is performed. For example, responsive to data backup being performed at a first time, the tenant data storage instructions 123, when executed by processor 110, may store a first tenant file for the first tenant. Responsive to data backup being performed at a second time later than the first time (e.g., after a next time interval, and/or other time), the tenant data storage instructions 123, when executed by processor 110, may cause storage of a second tenant file different from the first tenant file. In some examples, the second tenant file may only comprise data that has changed from the first tenant file (e.g., data that has changed for the tenant since the last backup of data). In other examples, the tenant data storage instructions 123, when executed by processor 110, may store a full set of data in a tenant file for the tenant each time data backup for the tenant is performed.

The tenant data storage instructions 123, when executed by processor 110, may cause storage of tenant files for each tenant of the multi-tenant application at the storage medium 120, at one or more of the data resources of the system 100, and/or at another non-transitory machine-readable storage medium accessible to the system.

In some examples, the instructions may also comprise tenant data restore instructions. For example, tenant data restore instructions, when executed by processor 110, may restore data for the first tenant based on the first tenant file stored by the tenant data storage instructions. The tenant data restore instructions, when executed by processor 110, may restore data responsive to receiving a request from a tenant, administrator, the application, and/or other source to restore data. The tenant data restore instructions, when executed by processor 110, may restore data for the first tenant by restoring, via respective adaptors for each data source, corresponding portions of the first set of data. For example, the tenant data restore instructions, when executed by processor 110, may restore a portion of the set of data to a data resource via a corresponding adaptor based on the portion of the data set being associated with a data resource identifier for the data resource.

In some examples, the request may comprise, for example, a time period from which data should be restored, a set of data resources to which data should be restored, a set of users for which data should be restored, and/or other information related to restoring data for a tenant. Responsive to the request comprising a time frame, the tenant data restore instructions, when executed by processor 110, may restore data for the first tenant by selecting a data set of data stored before the time frame for restoring the data resources. Responsive to the request comprising a set of data resources, the tenant data restore instructions, when executed by processor 110, may only restore data for the first tenant to those data resources included in the set of data resources. Responsive to the request comprising a set of users, the tenant data restore instructions, when executed by processor 110, may only restore data associated with users included in the first set of users.

In some examples, data specific to an individual user of a tenant may be backed up in a manner similar to the backup of data for an individual tenant.

FIG. 2 is a block diagram of an example system 200 for providing data backup for a multi-tenant application. As with system 100, system 200 may comprise a cloud server, a mainframe, notebook, desktop, tablet, workstation, mobile device, or any other device suitable for executing the functionality described below. As with processor 110 of FIG. 1, processor 210 may be one or more CPUs, microprocessors, and/or other hardware devices suitable for retrieval and execution of instructions.

As detailed below, system 200 may include a series of engines 220-230 for providing data backup for a multi-tenant application. Each of the engines may generally represent any combination of hardware and programming. For example, the programming for the engines may be processor executable instructions stored on a non-transitory machine-readable storage medium and the hardware for the engines may include at least one processor of the system 200 to execute those instructions. In addition or as an alternative, each engine may include one or more hardware devices including electronic circuitry for implementing the functionality described below.

Backup determination engine 220 may determine that a first data set for a first tenant from a multi-tenant application executing on an individual server should be backed up and determine, independently from determining that the first data set should be backed up, that a second data set for a second tenant from the application should be backed up. In some examples, the backup determination engine 220 may determine that data should be backed up in a manner the same as or similar to that of the backup determination instructions 121 of system 100. Further details regarding an example implementation of backup determination engine 220 are provided above in connection with backup determination instructions 121 of FIG. 1.

Tenant specific backup engine 230 may, responsive to determining that the first data set should be backed up, access a first portion of the first data set stored at a first data resource of a first type via a first adaptor comprising a first communication protocol for a first type of data resource. Tenant specific backup engine 230 may also access a second portion of the first data set stored at a second data resource of the second type via a second adaptor comprising a second communication protocol for a second type of data resource. The first and second data resources may be communicably coupled to the individual server and wherein the second communication protocol is different from the first communication protocol. Tenant specific backup engine 230 may also cause storage of the accessed portions of the first data set. Tenant specific backup engine 230 may perform similar functionality for each tenant responsive to the backup determination engine 220 determining that data for a tenant should be backed up.

In some examples, the tenant specific backup engine 230 may access and store data in a manner the same as or similar to that of the system 100. Further details regarding an example implementation of tenant specific backup engine 230 are provided above in connection with tenant data access instructions 122, tenant data storage instructions 123, and/or other descriptions related of FIG. 1.

FIG. 3 is a block diagram of an example system for providing data backup for a multi-tenant application. As illustrated in FIG. 3 and described below, system 300 may comprise a processor 310, a non-transitory machine readable storage medium 320, a series of engines 330-350 for providing data backup for a multi-tenant application, and/or other components. The system may communicate with tenants via tenant systems 390, 393, 396, and/or other tenant systems. Each tenant system may comprise multiple user computing devices. For example, tenant system 390 for a first tenant may comprise computing devices 391 and 392 for a first user and second user respectively. Similarly, tenant system 393 for a second tenant may comprise computing devices 394 and 395 for a first user and second user respectively. Tenant system 396 for a third tenant may comprise computing devices 397 and 398 for a first user and second user respectively. The number of tenant systems and user computing devices in each tenant system are not limited to the examples described herein.

As with processor 110 of FIG. 1, processor 310 may be one or more CPUs, microprocessors, and/or other hardware devices suitable for retrieval and execution of instructions. As with machine-readable storage medium 120, non-transitory machine-readable storage medium 320 may be any hardware storage device for maintaining data accessible to system 100. As with engines 220-230, engines 330-350 may generally represent any combination of hardware and programming.

Non-transitory machine-readable storage medium 320 may store tenant files 321 for each tenant accessing the multi-tenant application. For example, the tenant files 321 may comprise a plurality of tenant files for each tenant.

Backup determination engine 330 may perform functionality the same as or similar to that of the backup determination engine 220 of system 200. Further details regarding an example implementation of backup determination engine 330 are provided above in connection with backup determination engine 220 of system 200.

Tenant specific backup engine 340 may perform functionality the same as or similar to that of the tenant specific backup engine 230 of FIG. 2. Further details regarding an example implementation of tenant specific backup engine 340 are provided above in connection with tenant specific backup engine 230 of FIG. 2.

Tenant specific backup engine 220 may restore data for a tenant. In some examples, the tenant specific backup engine 220 may restore data in a manner the same as or similar to that of the tenant data restore instructions of system 100. Further details regarding an example implementation of tenant specific backup engine 220 are provided above in connection with tenant data restore instructions of FIG. 1.

As shown in FIG. 3, each tenant system (and user computing device) may communicate with system 100 to access the application of system 100. The system 100 may store, back up, and restore data from each tenant that accesses the application.

FIG. 4 is a flowchart of an example method for execution by a computing device for providing data backup for a multi-tenant application.

Although execution of the methods described below are with reference to system 100 of FIG. 1 system 200 of FIG. 2, and/or system 300 of FIG. 3, other suitable devices for execution of this method will be apparent to those of skill in the art. The method described in FIG. 4 and other figures may be implemented in the form of executable instructions stored on a machine-readable storage medium, such as storage medium 120, by one or more engines described herein, and/or in the form of electronic circuitry.

In an operation 400, a determination may be made that a first set of data for a first tenant should be backed up. For example, the system 100 (and/or the backup determination instructions 121, the backup determination engine 220, or other resource of the system 100) may determine that the first set of data should be backed up. The system 100 may determine that the first set of data should be backed up in a manner similar or the same as that described above in relation to the execution of the backup determination instructions 121, the backup determination engine 220, or other resource of the system 100.

In an operation 410, a first portion of the first data set may be accessed via the first adaptor from the first data resource of the first type. For example, the system 100 (and/or the tenant data access instructions 122, the tenant specific backup engine 230, or other resource of the system 100) may access the first portion of the first data set. The system 100 may access the first portion in a manner similar or the same as that described above in relation to the execution of the tenant data access instructions 122, the tenant specific backup engine 230, or other resource of the system 100.

In an operation 420, a second portion of the first data set may be accessed via the second adaptor from the second data resource of the second type. For example, the system 100 (and/or the tenant data access instructions 122, the tenant specific backup engine 230, or other resource of the system 100) may access the second portion of the first data set. The system 100 may access the second portion of the first data set in a manner similar or the same as that described above in relation to the execution of the tenant data access instructions 122, the tenant specific backup engine 230, or other resource of the system 100.

In an operation 430, the accessed portions of the first data set may be stored as a first tenant file. For example, the system 100 (and/or the tenant data storage instructions 123, the tenant specific backup engine 230, or other resource of the system 100) may store the accessed portions of the first data set. The system 100 may store the accessed portions of the first data set in a manner similar or the same as that described above in relation to the execution of the tenant data storage instructions 123, the tenant specific backup engine 230, or other resource of the system 100.

In an operation 440, a determination may be made that a second set of data for a second tenant should be backed up. For example, the system 100 (and/or the backup determination instructions 121, the backup determination engine 220, or other resource of the system 100) may determine that the second data set should be backed up. The system 100 may determine that the second data set should be backed up in a manner similar or the same as that described above in relation to the execution of the backup determination instructions 121, the backup determination engine 220, or other resource of the system 100.

In an operation 450, a first portion of the second data set may be accessed via the first adaptor from the first data resource of the first type. For example, the system 100 (and/or the tenant data access instructions 122, the tenant specific backup engine 230, or other resource of the system 100) may access the first portion of the second data set. The system 100 may access the first portion in a manner similar or the same as that described above in relation to the execution of the tenant data access instructions 122, the tenant specific backup engine 230, or other resource of the system 100.

In an operation 460, a second portion of the second data set may be accessed via the second adaptor from the first data resource of the first type. For example, the system 100 (and/or the tenant data access instructions 122, the tenant specific backup engine 230, or other resource of the system 100) may access the second portion of the second data set. The system 100 may access the second portion of the second data set in a manner similar or the same as that described above in relation to the execution of the tenant data access instructions 122, the tenant specific backup engine 230, or other resource of the system 100.

In an operation 470, the accessed portions of the second data set may be stored as a second tenant file. For example, the system 100 (and/or the tenant data storage instructions 123, the tenant specific backup engine 230, or other resource of the system 100) may store the accessed portions of the second data set. The system 100 may store the accessed portions of the second data set in a manner similar or the same as that described above in relation to the execution of the tenant data storage instructions 123, the tenant specific backup engine 230, or other resource of the system 100.

FIG. 5 is a flowchart of an example method for execution by a computing device for restoring data for a first tenant of the multi-tenant application.

In an operation 500, data may be restored for the first tenant. For example, the system 100 (and/or the tenant data backup instructions, the tenant specific restore engine 350, or other resource of the system 100) may restore data. The system 100 may restore data in a manner similar or the same as that described above in relation to the execution of the tenant data backup instructions, the tenant specific restore engine 350, or other resource of the system 100.

In some examples, operation 500 may comprise operations 510, 520, and/or other operations to restore data.

In an operation 510, a first set of data from a tenant file may be restored to the first data source of the first type. For example, the system 100 (and/or the tenant data backup instructions, the tenant specific restore engine 350, or other resource of the system 100) may restore the first set of data. The system 100 may restore the first set of data in a manner similar or the same as that described above in relation to the execution of the tenant data backup instructions, the tenant specific restore engine 350, or other resource of the system 100.

In an operation 520, a second set of data from a tenant file may be restored to the second data source of the second type. For example, the system 100 (and/or the tenant data backup instructions, the tenant specific restore engine 350, or other resource of the system 100) may restore the second set of data. The system 100 may restore the second set of data in a manner similar or the same as that described above in relation to the execution of the tenant data backup instructions, the tenant specific restore engine 350, or other resource of the system 100.

The foregoing disclosure describes a number of example embodiments for providing data backup for a multi-tenant application. The disclosed examples may include systems, devices, computer-readable storage media, and methods for selecting proxies. For purposes of explanation, certain examples are described with reference to the components illustrated in FIGS. 1-5. The functionality of the illustrated components may overlap, however, and may be present in a fewer or greater number of elements and components. Further, all or part of the functionality of illustrated elements may co-exist or be distributed among several geographically dispersed locations. Moreover, the disclosed examples may be implemented in various environments and are not limited to the illustrated examples.

Further, the sequence of operations described in connection with FIGS. 1-5 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following claims.

We claim:

1. A non-transitory machine-readable storage medium comprising instructions for providing data backup, the instructions executable by a processor of a computing device to:
   determine that a first data set for a first tenant from a multi-tenant application running on a server should be backed up;
   determine, independently from determining that the first data set for the first tenant should be backed up, that a second data set for a second tenant from the application should be backed up;
   responsive to determining that the first data set should be backed up, perform data back up for the first tenant by:
      accessing, via a first adaptor for a first type of data resource, a first portion of the first data set stored at a first data resource of the first type;
      accessing, via a second adaptor for a second type of data resource, a second portion of the first data set stored at a second data resource of the second type; and
      causing storing of the accessed portions of first data set; and
   responsive to determining that the second data set should be backed up, perform data back up for the second tenant by:
      accessing, via the first adaptor, a first portion of the second data set stored at the first data resource of the first type;
      accessing, via the second adaptor, a second portion of the second data set stored at the second data resource of the second type; and
      causing storing of the accessed portions of the second data set.

2. The storage medium of claim 1, wherein the instructions to determine to back up data for the second tenant independently of the determination to backup data for the first tenant comprises instructions to:
   perform data back up only for the second data set of the second tenant, without performing data back up for a data set associated with another tenant from the application.

3. The storage medium of claim 2, wherein the instructions to store the accessed portions of the first data set comprise instructions to:
   store, as a first tenant file for the first tenant, the accessed portions of the first data set, wherein the accessed portions were accessed at a first time; and
   store, as a second tenant file for the first tenant, portions of the first data set accessed at a second time different from the first time.

4. The storage medium of claim 3, further comprising instructions executable by the processor to:
   restore data for the first tenant based on the first tenant file.

5. The storage medium of claim 4, wherein the instructions to restore data for the first tenant comprise instructions to:
   restore, via the first adaptor, a first set of data from the first tenant file at the first data resource; and
   restore, via the second adaptor, a second set of data from the first tenant file at the second data resource.

6. The storage medium of claim 1, wherein the instructions to access the first portion of the first data set from the first data resource comprise instructions to:

communicate, via the first adaptor, with the first data resource using a first communication protocol of the first adaptor, wherein the first communication protocol comprises a communication protocol specific to the first type of data resource.

7. The storage medium of claim 6, wherein the instructions to access the first portion of the first data set from the first data resource comprise instructions to:
communicate, via the first adaptor, with the first data resource using a first predetermined set of queries associated with the first adaptor.

8. A system for providing data backup, the system comprising:
a backup determination engine to:
determine that a first data set for a first tenant from a multi-tenant application executing on an individual server should be backed up;
determine, independently from determining that the first data set should be backed up, that a second data set for a second tenant from the application should be backed up; and
a tenant specific backup engine to:
responsive to determining that the first data set should be backed up:
access, via a first adaptor comprising a first communication protocol for a first type of data resource, a first portion of the first data set stored at a first data resource of the first type, wherein the first data resource is communicably coupled to the individual server;
access, via a second adaptor comprising a second communication protocol for a second type of data resource, a second portion of the first data set stored at a second data resource of the second type, wherein the second data resource is communicably coupled to the individual server and wherein the second communication protocol is different from the first communication protocol; and
cause storage of the accessed portions of the first data set; and
responsive to determining that the second data set should be backed up:
access, via the first adaptor, a first portion of the second data set stored at the first data resource of the first type;
access, via the second adaptor, a second portion of the second data set stored at the second data resource of the second type; and
cause storage of the accessed portions of the second data set.

9. The system of claim 8, wherein the tenant specific backup engine:
determines that the first data set for the first tenant should be backed up from the application without determining whether a data set for another tenant should be backed up from the application.

10. The system of claim 8, wherein the tenant specific backup engine:
stores, as a first tenant file for the first tenant, the accessed portions of the first data set, wherein the accessed portions were accessed at a first time; and
stores, as a second tenant file for the first tenant, accessed portions of the first data set accessed at a second time different from the first time.

11. The system of claim 10, further comprising a tenant specific restore engine to:
restore data for the first tenant based on the first tenant file by:
restoring, via the first adaptor, a first set of data from the first tenant file at the first data resource; and
restoring, via the second adaptor, a second set of data from the first tenant file at the second data resource.

12. A method for providing data backup, the method comprising:
independently determining that a first data set for a first tenant from a multi-tenant application executing on a server should be backed up;
independently determining that a second data set for a second tenant from the application should be backed up;
responsive to determining that the first data set should be backed up:
accessing, via a first adaptor comprising a first communication protocol for a first type of data resource, a first portion of the first data set from a first data resource of the first type;
accessing, via a second adaptor comprising a second communication protocol for a second type of data resource, a second portion of the first data set from a second data resource of the second type; and
causing storage, as a first tenant file, of the accessed portions of the first data set; and
responsive to determining that data from the application for the second tenant should be backed up:
accessing, via the first adaptor, a first portion of the second data set from the first data resource of the first type;
accessing, via the second adaptor, a second portion of the second data set from the second data resource of the second type; and
causing storage, as a second tenant file, of the accessed portions of the second data set.

13. The method of claim 12, wherein independently determining that the first data set for the first tenant should be backed up comprises:
determining that the first data set should be backed up from the application without determining whether a data set for another tenant should be backed up from the application.

14. The method of claim 12, further comprising:
causing storage, as the first tenant file for the first tenant, the accessed portions of the first data set, wherein the accessed portions were accessed at a first time; and
causing storage, as a second tenant file for the first tenant, portions of the first data set accessed at a second time later from the first time, wherein the second tenant file comprises data from the first data resource and the second data resource that has changed from the first tenant file.

15. The method of claim 12, further comprising:
restoring data for the first tenant based on the first tenant file by:
restoring, via the first adaptor, a first set of data from the first file for the first tenant at the first data resource; and
restoring, via the second adaptor, a second set of data from the first file for the first tenant at the second data resource.

* * * * *